United States Patent
Moore et al.

(10) Patent No.: US 9,174,566 B1
(45) Date of Patent: Nov. 3, 2015

(54) REMINDER METHOD AND APPARATUS FOR A MOTOR VEHICLE DRIVER

(71) Applicants: Marc Moore, Albuquerque, NM (US); Wendy Sandberg, Albuquerque, NM (US); David Helper, Albuquerque, NM (US); Lisa Helper, Albuquerque, NM (US)

(72) Inventors: Marc Moore, Albuquerque, NM (US); Wendy Sandberg, Albuquerque, NM (US); David Helper, Albuquerque, NM (US); Lisa Helper, Albuquerque, NM (US)

(*) Notice: Subject to any disclaimer, the term of this patent is extended or adjusted under 35 U.S.C. 154(b) by 359 days.

(21) Appl. No.: 13/802,730

(22) Filed: Mar. 14, 2013

(51) Int. Cl.
*B60Q 9/00* (2006.01)
*B60Q 1/00* (2006.01)
B60R 22/00 (2006.01)
B60R 22/48 (2006.01)

(52) U.S. Cl.
CPC ... *B60Q 1/00* (2013.01); *B60Q 9/00* (2013.01); *B60R 22/00* (2013.01); *B60R 22/48* (2013.01)

(58) Field of Classification Search
CPC .......... B60R 22/48; B60R 22/00; B60Q 9/00; B60Q 1/00
USPC ...... 116/28 R, 1, 200, 201, 208–209, DIG. 1, 116/DIG. 44, 306–307; 340/457, 457.1, 340/539.15, 573.1, 667; 297/468; 40/591, 40/593; 280/727, 801.1
See application file for complete search history.

(56) References Cited

U.S. PATENT DOCUMENTS

| | | | | |
|---|---|---|---|---|
| 4,653,422 A * | 3/1987 | Allen | ........................ | 116/28 R |
| 4,747,616 A * | 5/1988 | Burris | ........................ | 280/807 |
| 5,269,392 A * | 12/1993 | Perrotti | ........................ | 180/287 |
| 5,627,512 A * | 5/1997 | Bogar | ........................ | 340/457.1 |
| 5,848,576 A * | 12/1998 | Colaianni | ........................ | 119/770 |
| 6,102,440 A * | 8/2000 | Bergkessel | ........................ | 280/808 |
| 6,809,640 B1 * | 10/2004 | Sherman | ........................ | 340/457.1 |
| 6,924,742 B2 | 8/2005 | Mesina | | |
| 6,998,988 B1 | 2/2006 | Kalce | | |
| 7,230,530 B1 * | 6/2007 | Almquist | ........................ | 340/539.15 |
| 7,457,695 B1 * | 11/2008 | Fields et al. | ........................ | 701/36 |
| 7,786,852 B2 | 8/2010 | Kautz | | |
| 7,908,777 B1 * | 3/2011 | Beardsley | ........................ | 40/320 |
| 8,058,983 B1 | 11/2011 | Davisson et al. | | |
| 8,120,499 B2 * | 2/2012 | Ortiz | ........................ | 340/573.1 |
| 8,408,156 B2 * | 4/2013 | Banda | ........................ | 116/28 R |
| 2005/0200465 A1 | 9/2005 | Fabors et al. | | |
| 2006/0176183 A1 * | 8/2006 | Jetton | ........................ | 340/573.1 |
| 2012/0074757 A1 | 3/2012 | Banda | | |
| 2012/0146383 A1 | 6/2012 | Chenault | | |

* cited by examiner

*Primary Examiner* — R. A. Smith
*Assistant Examiner* — Tania Courson
(74) *Attorney, Agent, or Firm* — Rod D. Baker (57) ABSTRACT

An apparatus and method for reminding a motor vehicle driver to take some action before exiting the vehicle. A reminder ribbon apparatus is disclosed. One end of the reminder ribbon is held in place at the driver's right side, as by being attached to the strap bracket anchoring the female seat belt buckle to the vehicle. The other end of the reminder ribbon is attached, as with a spring clip, to the seat belt when the seat belt buckle assembly is engaged to place the seat belt in the use position across the driver's torso. When the seat belt buckle assembly is disengaged, the reminder ribbon is drawn across the driver's torso by the automatically retracting seat-belt. The driver is reminded, by the presence of the ribbon across his torso, to take an action, for example to attend to a child in the back seat of the vehicle, before exiting.

13 Claims, 9 Drawing Sheets

REMINDER METHOD AND APPARATUS FOR A MOTOR VEHICLE DRIVER

FIELD OF THE INVENTION

This invention relates to motor vehicle safety devices, and in particular to an apparatus and method for reminding the driver of a motor vehicle that there is a passenger, such as an infant or pet, in the vehicle, such as prior to the driver's exiting the vehicle.

BACKGROUND OF THE INVENTION

The present apparatus and method addresses the growing problem of automobile drivers accidentally leaving their children or pets in the vehicle after it is parked. While relatively rare, there are an increasing number of incidents in which a driver—especially a very preoccupied driver, or a driver completely outside his or her normal routine—parks a motor vehicle at a destination, and then exits the vehicle and accidentally leaves an infant or pet inside the vehicle. (Nearly always, the infant or pet is sitting quietly in the back seat; the infant may be asleep in an infant safety seat.) The result can be tragic. On a hot day, the infant or pet can suffer potentially fatal heatstroke. Or the child could be kidnapped, or the driver may be charged with child neglect, etc.

There is a need for a simple, affordable, effective system for reminding the driver of a motor vehicle that he has a helpless passenger in the back seat. The system must be easy to use, so that drivers will not resent (and thus avoid) using it. It needs to be reliable, and most effective in the moment immediately before the driver leaves the vehicle. Indeed, the system preferably will not allow the driver to exit the vehicle without being reminded that there is a child in the car. The system should be simple and low-tech, for reasons both of reliability and of affordability. A simple, affordable system could be made readily available even to drivers of modest income.

A number of apparatus and systems have been proposed to remind a vehicle driver that he has a passenger. Previous efforts include U.S. Patent Application Publication No. 2005/0200465 to Fabors et al; U.S. Pat. No. 6,924,742 to Mesina; U.S. Pat. No. 6,998,988 to Kalce; U.S. Pat. No. 7,786,852 to Kautz; and U.S. Pat. No. 8,058,983 to Davisson et al. These systems, however, involve various electronic alarms, sensors, light beams, and the like, which may compromise reliability, affordability, and simplicity of installation or use. U.S. Patent Publication No. 2012/0146383 to Chenault appears to offer a possible method of preventing an adult passenger from exiting a vehicle without an accompanying child passenger, but is impractical for use by an automobile driver. U.S. Patent Application Publication No. 2012/0074757 to Banda shows a relatively simple device, but is cumbersome to use and evidently requires the vehicle door to be opened.

Against the foregoing background, the present invention was formulated.

SUMMARY OF THE INVENTION

Disclosure of the Invention

The apparatus of the present invention is broadly characterized as a "reminder ribbon" with a spring clip affixed to one end, and a holding means (such as a loop, weight, or a second or auxiliary clip) at the other end. In one preferred embodiment of the apparatus, there is a reminder ribbon with a loop on one end and a spring clip on the other. The loop is used to form a slip knot in a first or distal end of the reminder ribbon; the slip knot is a holding means used to releasably connect the distal end of the reminder ribbon to a portion of the vehicle interior adjacent the right side of the driver's seat. A spring clip or other temporary connector attached on the second or proximate end of the reminder ribbon is selectively attachable with certain portions of the vehicle's seat belt system. The apparatus is used in operative association with the driver's vehicle seat belt.

According to a method of the present invention, the distal end of the reminder ribbon is held in some manner to the vehicle interior, nearby the driver's right side. In a preferred mode of operation, the driver must disengage the proximate end of the reminder ribbon from the female buckle socket portion of the vehicle seat belt system before the driver will be able to fasten his own seat belt. With the proximate end of the reminder ribbon detached from the female seat belt buckle of the vehicle seat belt system, the driver secures the seat belt about his torso in the customary manner. The proximate end is then releasably attached, as with the spring clip, to the driver's seat belt, preferably near the male "tongue" portion of the buckle. Thereafter, when the driver unbuckles his seat belt, the seat belt automatically retracts, drawing the reminder ribbon across the driver's body; the driver cannot exit the vehicle without detaching the proximate end of the reminder ribbon from the retracted seatbelt.

A primary object of the present invention is to provide a method and apparatus for preventing the user from exiting her motor vehicle while forgetting that there is a passenger, such as an infant or pet, on the back seat of the vehicle.

A primary advantage of the apparatus of the present invention is that it requires no electrical or signal circuitry, and thus is reliable, durable, and affordable to fabricate.

Another advantage of the present invention is that it is simple to use, thus promoting habitual use by a vehicle driver.

Another advantage of the method of the present invention is that the user is prompted to use it upon taking her seat in the driver's seat of a motor vehicle.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

The drawings are intended to be diagrammatic only, and are not necessarily to scale either within a particular figure or between figures. Like numerals are used to denote the same or similar components throughout the several figures.

DESCRIPTION OF THE PREFERRED EMBODIMENTS

Best Modes for Carrying Out the Invention

The present invention relates to an apparatus and method for reminding the driver of a motor vehicle, prior to the driver's exiting the vehicle, that there is a passenger, such as an infant or pet, in the vehicle (typically on the back seat). It is contemplated that the invention finds specific utility in preventing the user from exiting a motor vehicle while unintentionally leaving a child, or handicapped person, or pet, in the vehicle. However, it may also be used to remind a user to do some other task, including retrieving some cargo from a vehicle trunk, rooftop or rooftop rack, or other vehicle compartment, prior to exiting the vehicle or departing from the vicinity of the vehicle. Further, the apparatus and method may find secondary utility as a reminder to a driver to take some action upon entering the vehicle.

Attention is now invited to the drawing figures, in which like label numerals identify the same or similar apparatus elements throughout the various views. It must be understood that processes and methods are disclosed hereby as being performed by various and selected steps. The steps of any process or procedure in accordance herewith are not necessarily performed in any particular order, there being provided overall procedural guidance for making the products according the disclosure. Except as expressly limited in the claims appended hereto, the steps recited for the methods of this disclosure may be performed in different orders or sequences corresponding to various different embodiments. A person of skill in the art will recognize that the sequence of steps may vary from those disclosed hereinafter without departing from the scope and spirit of the invention, as limited solely by sequence limitations required by the claims hereinafter.

Figure 1:
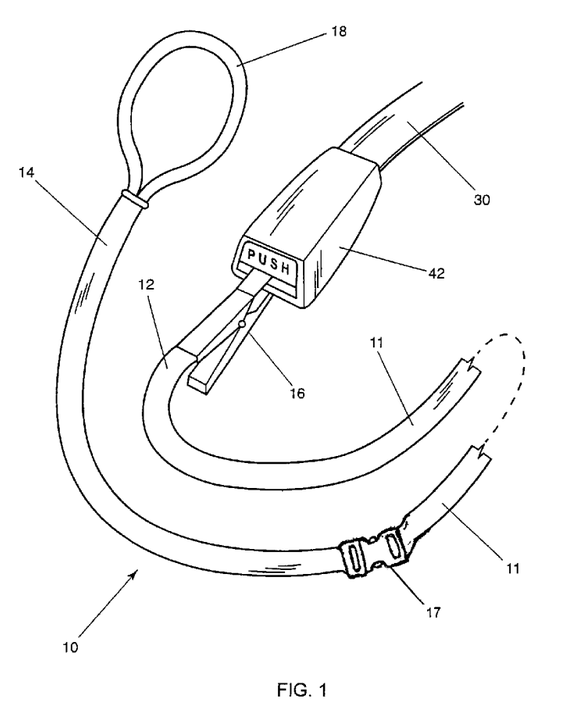
FIG. 1 is a perspective view of an embodiment of an apparatus according to the present invention, showing the apparatus releasably engaged with the female buckle portion of a motor vehicle seat belt buckle.
Figure 2:
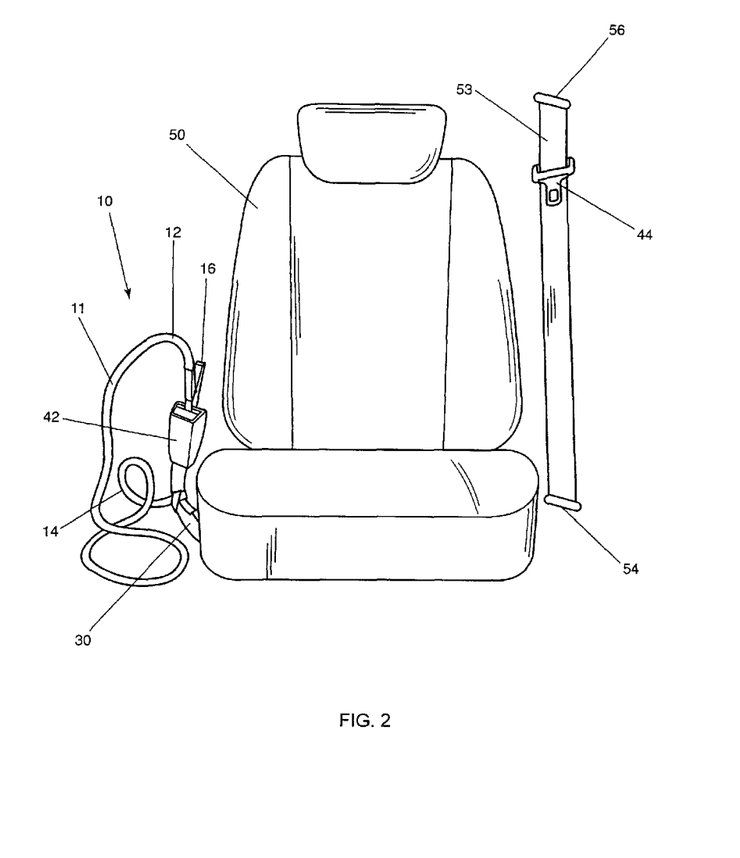
FIG. 2 is a front view of a driver's seat and seat belt system in a motor vehicle, showing an embodiment of the present apparatus, as it appears prior to the user's taking his seat, and in position for the first step of the method of use.
Figure 3:
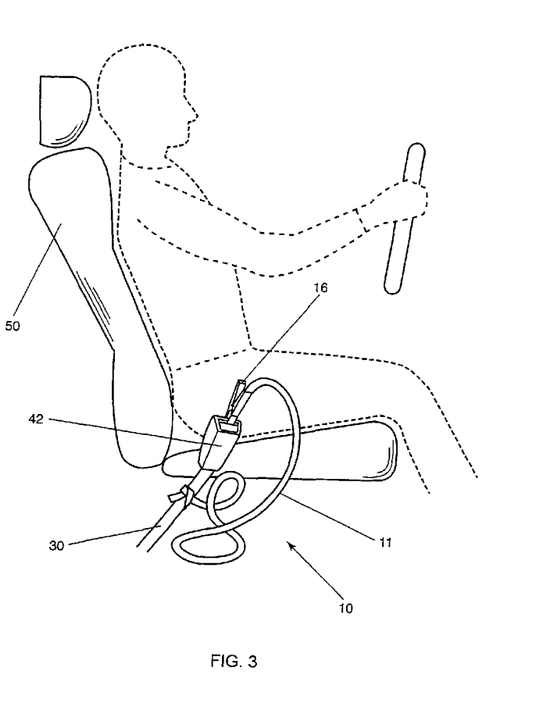
FIG. 3 is a side view of the apparatus of the invention as seen in FIG. 2, the driver-user depicted in phantom in the driver's seat, and the apparatus in position for the first step of the method of use.

FIGS. 1-3 depict the apparatus 10 when not in active use, but rather waiting to be deployed. The apparatus 10 includes a flexible strap 11, called here a "reminder ribbon." The reminder ribbon 11 may be composed of nylon, plastic, fabric or other suitable lightweight generally non-elastic material. The reminder ribbon 11 may be, for example, about an inch wide and very approximately 3 feet to approximately 4.5 feet long (depending on the embodiment; versions for use in relatively large pickup trucks or sport utility vehicles may be longer). The reminder ribbon ideally is a flat ribbon but alternatively may be a round cord or cable. The reminder ribbon 11 may be a fluorescent color, or decorative, or be embroidered with a child's or pet's name, or a reminder message.

A preferred embodiment of the apparatus includes means for quickly releasing or detaching the ribbon 11 in the event of an emergency. When the invention is in its most active use position, the ribbon 11 is disposed across a portion of the user's torso. Accordingly, there preferably is provided a quick-release buckle clip 17 at a suitable and appropriate location along the length of the reminder ribbon 11, as seen in FIG. 1. The quick-release buckle clip 17 is any suitable connector that while providing a reliable connection between segments of the ribbon 11, nevertheless can be quickly and easily disconnected in the event of an emergency; an ideal buckle clip 17 may be disconnected by the user's deliberately and moderately forcefully pulling or jerking on the respective segment(s) of the ribbon 11 on either or both sides of the buckle clip 17. A suitable buckle clip 17 is any of the variety of commercially available quick-release trident or quick side-release type buckles, such as Item # SR34CONT available from Granat Industries, Inc., of Elk Grove Village, Ill., USA.

FIG. 2 illustrates a context for the practice of the invention. The apparatus and method are utilized at the driver's seat 50 of a motor vehicle. There is provided in the vehicle a seat belt system according to standard construction, configuration, and operation. The seat belt 52 is seen in rest position to the driver's left side as seen in FIG. 2. The usual seat belt 52 has a lower end 54 that is firmly secured to the frame or floor or other anchoring portion of the vehicle. An upper end 53 of the seat belt typically is in operable connection with a retraction mechanism 56 (also known as roll-up device or inertia reel) mounted to the vehicle frame at a location above and generally proximate to the driver's left shoulder. The retraction mechanism 56 is designed to stow any length of seat belt webbing not in use, and to lock in a predetermined situation (e.g. sudden acceleration in an auto accident). The construction and function of various types of seatbelt refraction mechanisms are well-known in the automotive arts. General information regarding seat belt components technology and terminology is available at http://www.securon.co.uk/seat_belts_components.htm.

Figure 4:
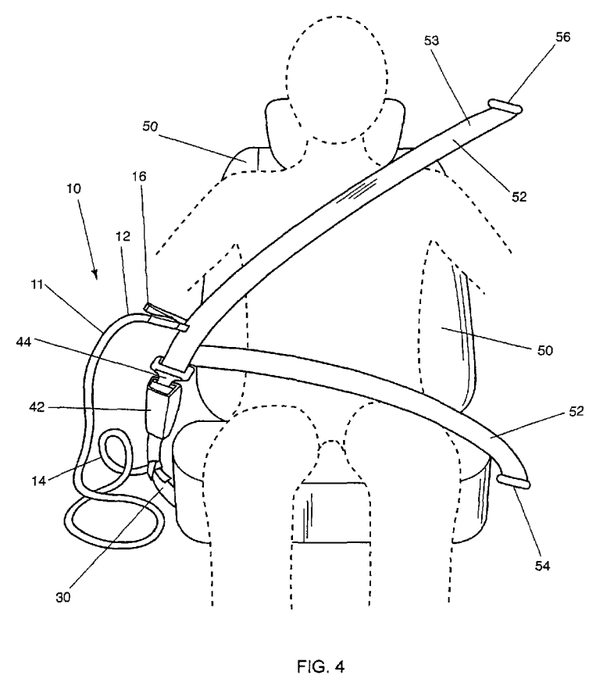
FIG. 4 is a front view of a driver's seat and seat belt system in a motor vehicle, the driver-user depicted in phantom, showing an embodiment of the present apparatus, as it appears after the user has taken his seat and engaged the seat belt system of the vehicle, and showing the apparatus in position after a subsequent step of the method of use.

The refraction-extension mechanism 56 allows the user manually to extend the seat belt 52 to an appropriate effective length for use in securing the user in the vehicle. If released by the user, the seatbelt 52 is taken up or reeled in by the action of the retraction mechanism 56, and thus is automatically retracted to the rest position nearby the driver's side door, as seen in FIG. 2. Disposed upon the seat belt 52 is a male buckle portion or tongue 44. The tongue 44 ordinarily incorporates a loop whereby the tongue 44 is controllably slidable, by the user, along a length of the seat belt 52 while adjusting the effective length of the seat belt for active use. A seat belt 52 in active use is seen in FIG. 4. In active use, the seat belt 52 is withdrawn from the refraction mechanism 56 until a comfortably effective length is available, whereupon the tongue 44 is releasably locked into engagement with a female buckle 42 of the seatbelt system, in accordance with convention. The female seat belt buckle 42 and the tongue 44 may be referred to jointly as the seat belt buckle assembly. The female buckle 42 is securely anchored to the floor or other foundational component of the vehicle by means of a heavy-duty stalk, cable, or strap bracket 30. In the active use position seen in FIG. 4, the seat belt 52 has a portion thereof extending from the retractor mechanism 56 to the engaged buckle assembly 42, 44 (and the portion thus is drawn across the driver's torso and left shoulder), and a portion extending from the engaged buckle assembly to the lower anchor 54 of the system (and thus is drawn across the driver's lap).

Attention is returned to FIGS. 1-3. The proximate end 12 of the ribbon 11 has attached thereto a first spring-loaded clip 16, such as a large, (e.g. plastic) "alligator" type clip, that is comfortably operated with one hand. This main clip 16 is used to releasably attach the proximate end of the ribbon 11 to either the female buckle 42 or to the web of the seat belt 52 in manners further to be described. The distal end 14 of ribbon 11 has attached thereto any of a number of components or assemblies being means for holding the distal end of the ribbon in proper place during use; in FIGS. 1-5 and 6A, such a holding means is a loop 18 in, or on, the distal end 14 of the ribbon 11.

Figure 6A:
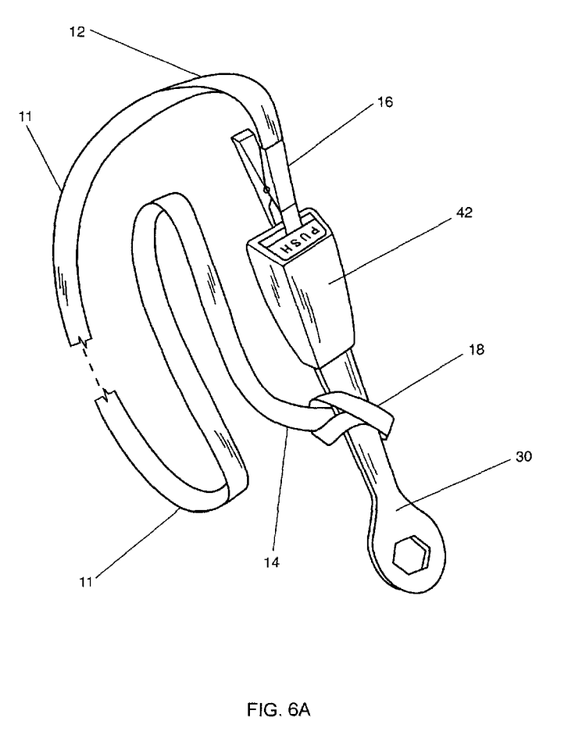
FIG. 6A is a relatively enlarged view of the apparatus according to the invention, depicting a preferred mode of releasably connecting a distal end of the apparatus to a seatbelt anchor bracket portion of a vehicle with a slip knot.

In a preferred embodiment and practice of the invention, the distal end 14 of the ribbon 11 is provided with a loop 18 thereon. Preferably, the loop 18 is defined simply by looping an end of the ribbon 11 back to itself and securing (as by sewing, riveting, adhesives, etc.) that end to the trunk of the ribbon. The body of the loop 18 preferably is of the same flexible material as the ribbon 11 itself. In a preferred practice, the distal end of the ribbon 11 may be held to the strap bracket 30 by passing the proximate end 12 of the ribbon through the loop 18 to create a basic slip knot. The slip knot thus created is placed over a lower segment of the strap bracket 30 and cinched tight, thus tying the distal end of the reminder ribbon 11 to the strap bracket as seen in FIG. 6A and suggested in FIGS. 2-4, and thus functioning as a means for holding the distal end substantially near the female seat belt buckle 42. In a simple embodiment of the apparatus, there is no loop at the distal end 14 of the ribbon 11; rather, a free distal end of the ribbon could simply be tied directly to the anchor bracket 30 with a basic overhand knot, thus comprising an alternative means for holding the distal end substantially near the female seat belt buckle 42.

Figure 6B:
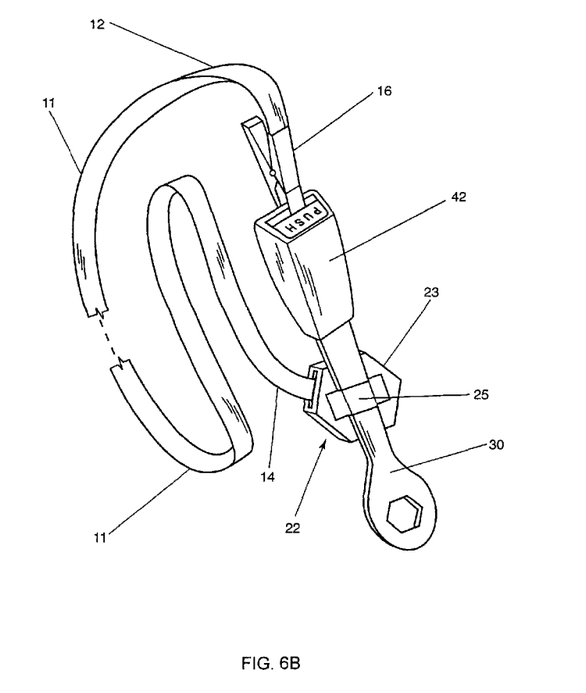
FIG. 6B is a view similar to the view of FIG. 6A, showing an alternative mode for releasably connecting a distal end of the apparatus to a seatbelt anchor bracket portion of a vehicle using a spring-actuated take-up reel.

A more sophisticated alternative embodiment seen best in FIG. 6B has a spring-driven reel 22 to which the distal end 14 of the reminder ribbon 11 is attached and then wound (in a manner reminiscent, for example, of extendible-retractable tape measures). The reminder ribbon 11 thus can be paid out (unwound) from the reel housing 23 by pulling on the proximate end 12 of the ribbon 11. If the proximate end 12 of the reminder ribbon 11 is released, the ribbon is automatically retracted within the reel 22 and wound upon the spool inside the reel housing 23, by the action of a driving spring, again generally in accordance with conventional spring-biased take-up reels. As seen in FIG. 6B, the reel housing 23 may have an attachment strap 25 for securely yet releasably attaching the reel 22 to a strap-bracket 30 which anchors the female buckle portion 42 of the seat belt buckle assembly to the floor (or other anchor location) of the vehicle. The attachment strap 25 may be fastened securely in place upon the strap-bracket 30 (or adjacent portion of the seat belt system) using a VELCRO® brand hook-and-loop fabric fastener, snap fasteners, or the like. Thus holding the distal end in position may mean attaching to the bracket 30 this spring-driven reel, wherein the distal end 14 is connected to the reel and the ribbon 11 is retractably windable into the reel assembly. This reel assembly with the reminder ribbon windable therein thus is an alternative means for holding the distal end 14 of the reminder ribbon 11 substantially near the female seat belt buckle 42.

Figure 6C:
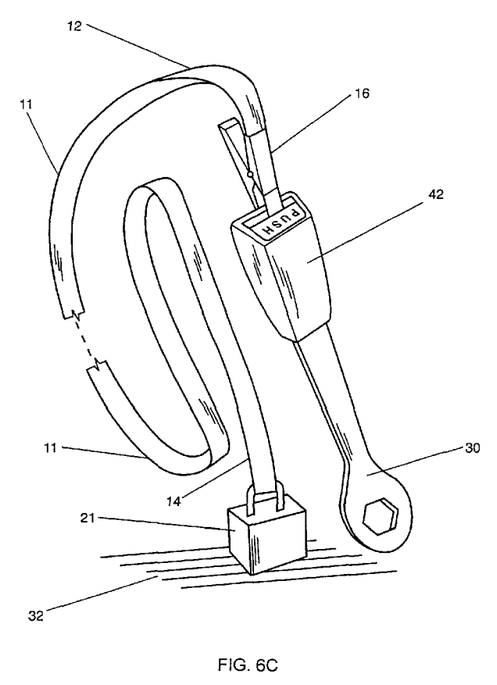
FIG. 6C is a view similar to the view of FIG. 6A, showing an alternative mode for releasably connecting a distal end of the apparatus to the floor of a vehicle using weight anchor.
Figure 7:
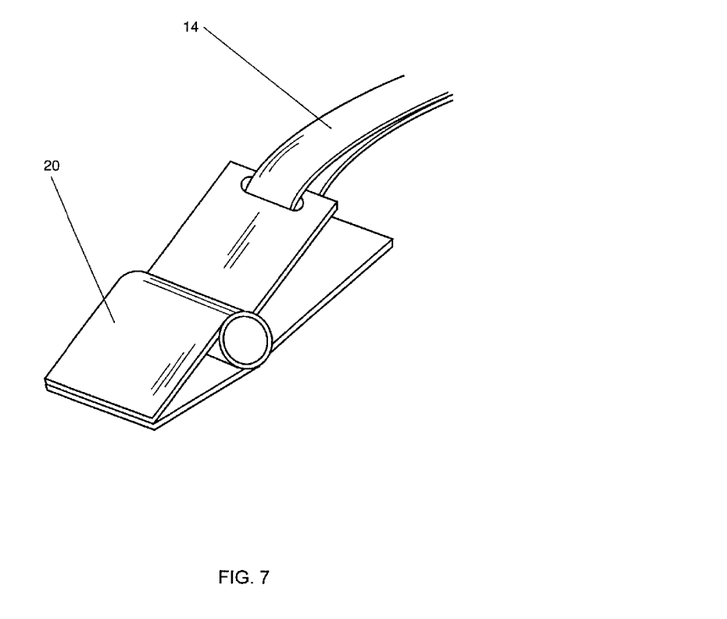
FIG. 7 is a perspective view of an auxiliary spring clip on the distal end of a reminder ribbon according to an embodiment of the apparatus of the invention, this auxiliary spring clip serving as an alternative means for releasably connecting the distal end of the apparatus to a seatbelt anchor portion of a vehicle.

In another alternative embodiment, the distal end 14 of the ribbon 11 may be provided with a large plastic "alligator" clip 20 (FIG. 7) for removably clipping the distal end 14 to the seat belt strap-bracket 30 or other adjacent anchor portion of the vehicle, such as the female buckle 42 itself. This auxiliary spring clip 20 thus is an alternative possible means for holding the distal end substantially near the female seat belt buckle 42. Or, as indicated in FIG. 6C, a modest weight 21 may be securely attached to the distal end 14 of the reminder ribbon 11. During use, the weight 21 rests upon the vehicle floor 32 on the right (i.e., driver's right) side of the driver's seat 50, nearby the strap bracket 30. The weight 21 accordingly holds the distal end 14 of the reminder ribbon 11 in place (e.g., substantially near the female seat belt buckle 42) during use.

The apparatus 10 thus is easily installed into the vehicle by holding or connecting the distal end 14 of the ribbon 11 to the vehicle at a location at or generally near the female seat belt buckle 42 (and thus the seat belt strap buckle 30). This holding or connecting, which is firm but releasable, is accomplished by, for example, tying the distal end 14 (with or without a loop 18) to the seat belt strap-bracket 30 (FIG. 6A), or (in alternative embodiments) attaching the reel assembly 22 to the strap bracket (FIG. 6B), or by resting the weight 21 on the floor of the vehicle near the strap bracket (FIG. 6C). Yet alternatively, an auxiliary clip 20 (FIG. 7) on the distal end 14 of the reminder ribbon 11 can be releasably attached by clipping it to the seat belt strap-bracket 30 or other vehicle component near the female buckle 42.

The apparatus 10 ready for use (as the driver is about to take her seat) is situated as seen in FIG. 2. The main spring clip 16 on the proximate end 12 of the apparatus 10 is inserted into the slot or socket of the female seat belt buckle 42, that is, the aperture into which the tongue 44 of the buckle assembly is engaged to lock-connect the driver's seat belt 52 for use while driving. Accordingly, the proximate end spring clip 16, as so releasably engaged in the buckle 42, prevents the driver from fastening her seat belt until she has removed the proximate end spring clip 16 from the female seat belt buckle 42. Thus, the driver-user, after placing her pet or child in the vehicle, sits down in the driver's seat 50 (FIG. 3) and, in order to use the vehicle seat belt 52, must reach down to disengage and remove the first spring clip 16 from the female seat belt buckle 42, to permit insertion of the male tongue 44 into the buckle 42.

An aspect of the present invention thus is the advantageous reminder provided when the user first enters the vehicle. When fully and properly used, the main spring clip 16 is releasably engaged into the seat belt buckle 42 (as seen in FIG. 2) whenever the seat belt system is not in active use as seen in FIG. 4. Accordingly, the method and apparatus may serve to remind the driver, upon entering the vehicle, that he or she has previously placed an item in or on the vehicle, or needs to execute some other user-selected task, prior to starting the vehicle. It may be as simple as reminding the driver to check for an item previously placed on an automobile rooftop, or as serious as that the driver placed a child in a backseat baby seat-carrier sometime prior to opening the driver's door ultimately to enter the vehicle.

Attention is invited to FIG. 4. After the user has fastened her seat belt 52 by inter-engaging the seat belt buckle assembly (42, 44), she then uses the main spring clip 16 to releasably attach the proximate end of the reminder ribbon 11 to her seat belt 52, preferably in close vicinity with the seat belt buckle assembly 42, 44. She may then start and then drive the vehicle to her destination. The apparatus 10 is seen in this "active" position in FIG. 4.

Upon reaching his or her destination, the driver cannot exit the vehicle without disconnecting and releasing the seat belt 52. Upon releasing the seat belt 52, it automatically retracts by the action of the retractor mechanism 56 standard in all modern vehicles. This automatic retraction of the seat belt 52 draws the seat belt (including the tongue portion 44) from its active use position (e.g., in FIG. 4) across the driver's body from his right side to his left, that is, toward the driver side door (where the belt 52 is urged ultimately to its "rest" position (seen in FIG. 2). However, as the seatbelt 52 so retracts, it carries with it the proximate end 12 of the reminder ribbon 11, because the proximate end of the reminder ribbon is clipped to the seat belt 52 near the tongue 44.

Figure 5:
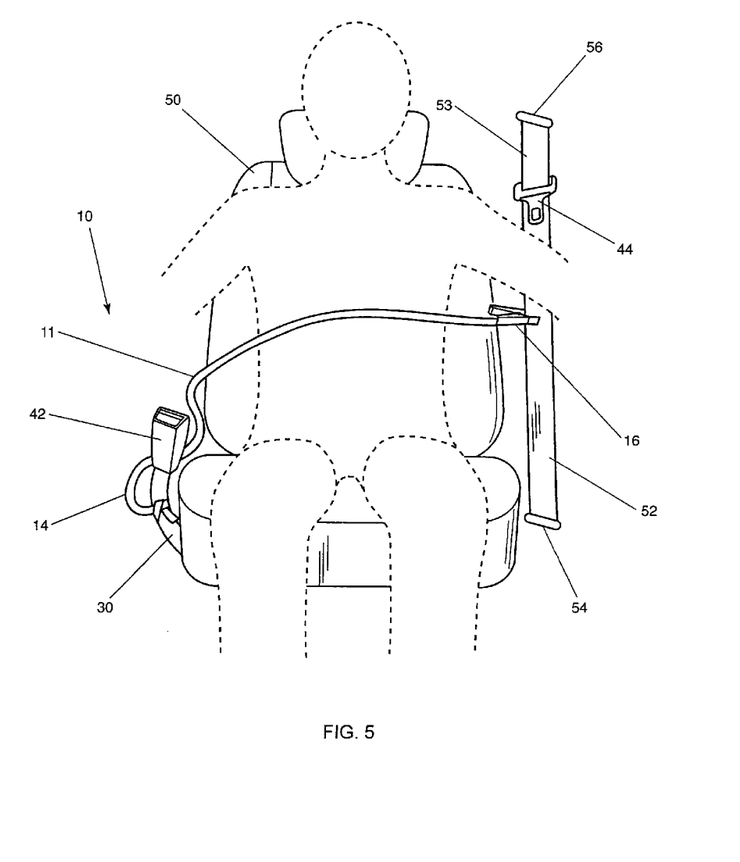
FIG. 5 is a front view similar to FIG. 4, showing an embodiment of the present apparatus as it appears after the driver-user has disengaged the seat belt system of the vehicle, before exiting the vehicle, thus showing the apparatus in position after another subsequent step of the method of use.

Immediately before the driver-user disengages the seat belt buckle assembly 42, 44, the apparatus 10 is in its active use position seen in FIG. 4. After disengaging the buckle assembly 42, 44 and allowing the seat belt 52 to retract to its rest position, the apparatus 10 and set belt system appear as shown in FIG. 5. The retracted seat belt 52 is withdrawn to be at the driver's left side, near the driver's side door of the vehicle. The proximate end 12 of the reminder ribbon 11 also is near the driver's door, as it is clipped, with the main clip 16, to the seat belt 52 as seen in FIG. 5. The distal end 14 of the reminder ribbon 11 remains at the driver's right side, as it is in place (by weight 21) either on the floor near the center of the vehicle, or preferably is attached to the seat belt strap-bracket 30. Accordingly, disengaging the seat belt assembly 42, 44 is followed by an allowing the seat belt 52 to retract automatically from its use position to its rest position, thereby drawing with it the proximate end 12 of the ribbon, and thus disposing a length of the ribbon 11 across the user's body. The reminder ribbon 11 thus is disposed across the driver's torso from right to left. The driver seen in FIG. 5 thus has an irresistible reminder, as she cannot leave her seat 50 until she detaches the reminder ribbon 11 from the seat belt 52, i.e., by detaching the proximate spring clip 16. This need to detach the reminder ribbon 11, ordinarily even before the driver's door is opened, serves to remind that there is a child, pet, cargo, etc. in the back seat.

After detaching the first, main, spring clip 16 from the seat belt 52, the driver inserts it back into the socket slot of the female seat belt buckle 42, as seen in FIGS. 1 and 2 for example, where it ready for re-use when the driver re-takes her seat. Upon re-entering the vehicle, the driver is unable to use the seat belt system to safely secure herself in the seat 50, without first removing the main clip 16 from the buckle 42. (The first clip 16 thus reminds the user to use the invention, because so long as the clip 16 is in the socket of the buckle 42, the tongue 44 cannot be engaged therein to put the seat belt system into active use.)

The method of the present disclosure is apparent from the foregoing, but is here generally characterized. The method is for reminding a motor vehicle driver prior to the driver exiting the vehicle—or even prior to opening the driver's side door—to take some desired action. The basic method includes providing a reminder ribbon 11 having a proximate end 12 and a distal end 14, holding the distal end substantially near a female seat belt buckle 42, engaging together the female seat belt buckle and a male tongue 44 of a seat belt buckle assembly; and then releasably attaching the proximate end to a seat belt 52. The preferred method comprises the further steps of disengaging the seat belt buckle assembly 42, 44 after the step of releasably attaching the proximate end 12 to the seat belt 52, and then allowing the seat belt to retract automatically from a use position to a rest position, thereby drawing with it the proximate end 12 of the reminder ribbon 11.

Before the step of engaging together the female seat belt buckle 42 and a male tongue 44, the step of releasably engaging the proximate end 12 with the female seat belt buckle 42 preferably is taken. This step offers a reminder to the user-driver to deploy the apparatus upon entering the vehicle and taking his seat, prior to using the seatbelt system. This step of releasably attaching the proximate end 12 to the female seat belt buckle 42 preferably comprises inserting a spring clip 16 into a slot in the female seat belt buckle.

There preferably is in the vehicle, near the driver's right side while seated, a bracket 30 for anchoring the female seat belt buckle 42 to the vehicle floor or frame. The step of holding the distal end 14 of the reminder ribbon comprises the steps of defining a loop 18 at the distal end of the ribbon 11, and then releasably connecting the loop to the bracket. This step of releasably connecting the loop 18 to the bracket 30 preferably comprises tying with a knot, such as a simple slip knot. Alternatively, the step of holding the distal end 14 may comprise simply tying the distal end directly to the bracket 30 without first defining or providing a loop.

In another version of the method, the step of holding the distal end 14 comprises attaching a weight 21 to the distal end, and resting the weight upon the floor of the vehicle. In yet another alternative mode of the invention, the step of holding the distal end 14 comprises attaching to the bracket 30 a spring-driven reel 22, wherein the distal end is connected to the reel 22 and the ribbon 11 is retractably windable into the reel 22. In another alternative version of the method, the step of holding the distal end 14 comprises providing a second spring clip 20 on the distal end 14, and releasably attaching the second spring clip to the bracket 30 or to the female seat belt buckle 42.

Succinctly generalized, therefore, one preferred method according this disclosure includes the steps of:
 (a) providing a reminder ribbon 11 having a proximate end 12 and a distal end 14 (FIG. 1);
 (b) holding the distal end 14 substantially near a female seat belt buckle 42 (e.g., FIGS. 1-6);
 (c) releasably engaging the proximate end 12 with the female seat belt buckle 42 (FIGS. 1-3);
 (d) disengaging the proximate end 12 from the female seat belt buckle 42;
 (e) engaging together the female seat belt buckle 42 and a male tongue 44 of a seat belt buckle assembly to place a seat belt in a use position (FIG. 4);
 (f) releasably attaching the proximate end 12 to a seat belt 52 (FIG. 4);
 (g) disengaging the seat belt buckle assembly 42, 44; and
 (h) allowing the seat belt 52 to retract automatically from the use position (FIG. 4) to a rest position (FIG. 5), thereby drawing with it the proximate end 12 of the reminder ribbon 11.

Although the invention has been described in detail with particular reference to these preferred embodiments, other embodiments can achieve the same results. Variations and modifications of the present invention will be obvious to those skilled in the art, and it is intended to cover in the appended claims all such modifications and equivalents. The entire disclosures of all patents and patent publications cited herein above are incorporated herein by reference.

What is claimed is:

1. A reminder apparatus useable in combination with a motor vehicle seat belt system featuring a seat belt and a female seat belt buckle, the reminder apparatus comprising:
   a reminder ribbon having a proximate end and a distal end;
   means at the distal end for holding the distal end substantially near the female seat belt buckle; and
   means on the proximate end for releasably attaching the proximate end to a seat belt.

2. A method for reminding a motor vehicle driver prior to the driver's exiting the vehicle, comprising the steps of:
   providing a reminder ribbon having a proximate end and a distal end;
   holding the distal end substantially near a female seat belt buckle;
   engaging together the female seat belt buckle and a male tongue of a seat belt buckle assembly; and
   releasably attaching the proximate end to a seat belt.

3. The method according to claim 2 further comprising the steps of:
   after the step of releasably attaching the proximate end to the seat belt, disengaging the seat belt buckle assembly; and
   allowing the seat belt to retract automatically from a use position to a rest position, thereby drawing with it the proximate end of the reminder ribbon and disposing a length of the ribbon across the driver's body.

4. The method according to claim 2 wherein the step of releasably attaching the proximate end to the seat belt comprises attaching with a first spring clip.

5. The method according to claim 2 further comprising, before the step of engaging together the female seat belt buckle and the male tongue, the steps of releasably engaging and then disengaging the proximate end of the reminder ribbon with the female seat belt buckle.

6. The method according to claim 5 wherein the step of releasably engaging the proximate end with the female seat belt buckle comprises inserting a first spring clip into the female seat belt buckle.

7. The method according to claim 2 wherein there is a bracket for anchoring the female seat belt buckle, and wherein the step of holding the distal end comprises the steps of defining a loop at the distal end of the ribbon and releasably connecting the loop to the bracket.

8. The method according to claim 7 wherein the step of releasably connecting comprises tying with a slip knot.

9. The method according to claim 2 wherein there is a bracket for anchoring the female seat belt buckle, and wherein the step of holding the distal end comprises tying the distal end to the bracket.

10. The method according to claim 2 wherein the step of holding the distal end comprises:
    attaching a weight to the distal end; and
    resting the weight upon the floor of the vehicle.

11. The method according to claim 2 wherein there is a bracket for anchoring the female seat belt buckle, and wherein the step of holding the distal end comprises attaching to the bracket a spring-driven reel, wherein the distal end is connected to the reel and the ribbon is retractably windable into the reel.

12. The method according to claim 2 wherein there is a bracket for anchoring the female seat belt buckle, and wherein the step of holding the distal end comprises:
    providing a second auxiliary spring clip on the distal end; and
    releasably attaching the second spring clip to the bracket or to the female seat belt buckle.

13. A method for reminding a motor vehicle driver prior to the driver's exiting the vehicle, comprising the steps of:
    providing a reminder ribbon having a proximate end and a distal end;
    holding the distal end substantially near a female seat belt buckle;
    releasably engaging the proximate end with the female seat belt buckle;
    disengaging the proximate end from the female seat belt buckle;
    engaging together the female seat belt buckle and a male tongue of a seat belt buckle assembly to place a seat belt in a use position;
    releasably attaching the proximate end to a seat belt;
    disengaging the seat belt buckle assembly; and
    allowing the seat belt to retract automatically from the use position to a rest position, thus drawing with it the proximate end of the reminder ribbon and disposing a length of the ribbon across the driver's body.

* * * * *